Sept. 18, 1923.  
H. E. BRUNNER ET AL  
JOURNAL BEARING  
Filed May 18, 1920

1,468,134

Inventors  
Harold E. Brunner  
William Jetter  
By their Attorneys  
Rogers, Kennedy & Campbell Patented Sept. 18, 1923.

1,468,134

UNITED STATES PATENT OFFICE.

HAROLD E. BRUNNER, OF LARCHMONT, NEW YORK, AND WILLIAM JETTER, OF COLLINGSWOOD, NEW JERSEY, ASSIGNORS TO THE HESS-BRIGHT MANUFACTURING COMPANY, A CORPORATION OF DELAWARE.

JOURNAL BEARING.

Application filed May 18, 1920. Serial No. 382,242.

*To all whom it may concern:*

Be it known that we, HAROLD E. BRUNNER and WILLIAM JETTER, citizens of the United States, residing at Larchmont, in the county of Westchester and State of New York, and Collingswood, county of Camden, State of New Jersey, respectively, have invented certain new and useful Improvements in Journal Bearings, of which the following is a specification, reference being had therein to the accompanying drawing.

This invention relates to journal bearings, and is particularly adapted for use in railway cars, the object of the invention being to provide a mounting for anti-friction bearings in such a manner that they will be safeguarded from the normal shocks incident to end thrust, and the end thrust will be elastically supported within predetermined limits. Another object of the invention is to provide an anti-friction bearing mounting for journals in which the entire mounting may be readily unseated from the journal, and cleaned and inspected without the loss of lubricant contained within the housing, the parts affording the connection between the mounting and journal being housed within a suitable casing which need not be opened to permit mounting and demounting the structure, the assembled structure being constructed and adapted for interchangeable mounting, demounting and replacement as a self-contained, handling unit.

In the drawing accompanying this application one practicable embodiment of the invention is illustrated, in which drawing.

Figure 1:
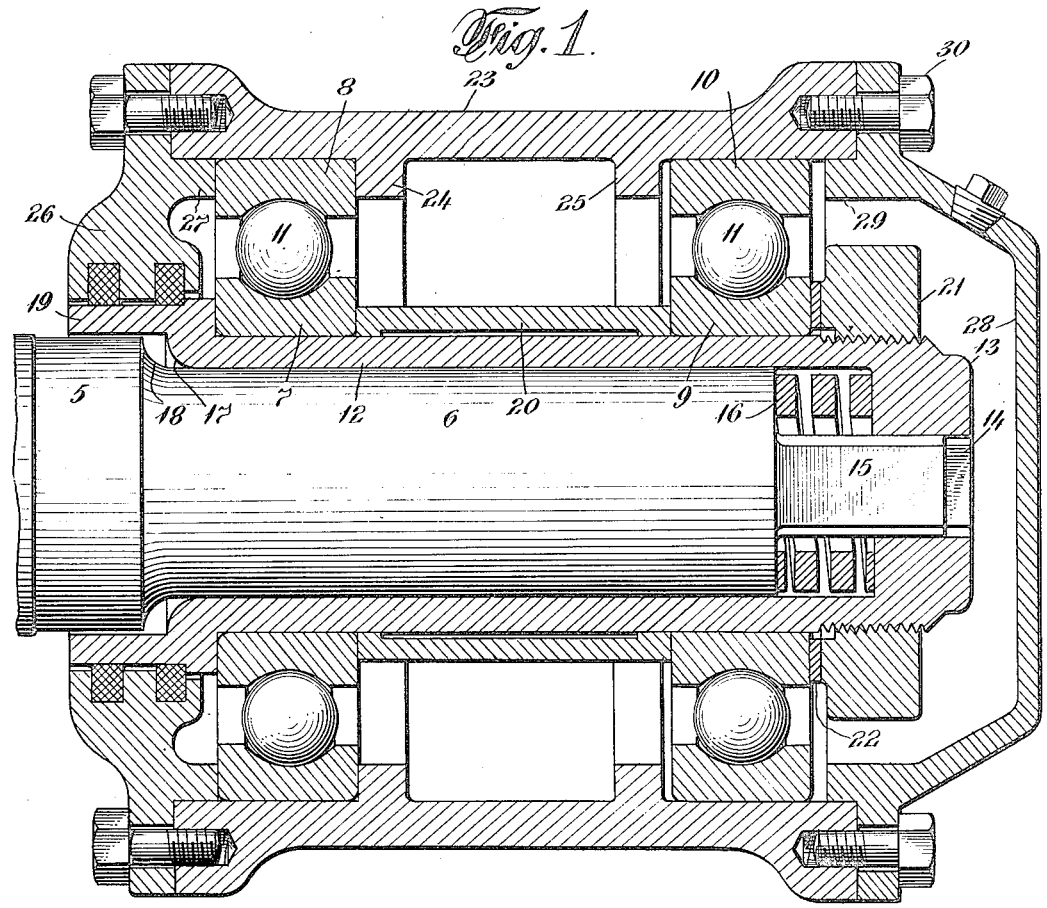
Figure 1 is a longitudinal section of my improved journal bearing.
Figure 2:
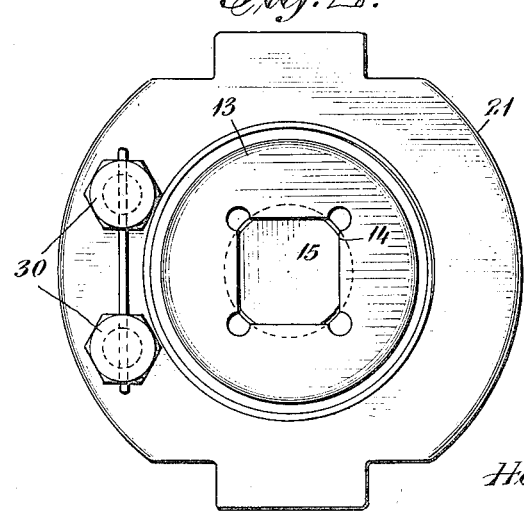
Fig. 2 is an end view of a portion thereof showing the manner in which the sleeve is caused to rotate with the journal.

An axle 5 is illustrated having a journal 6, which is to receive the support of the bearing. The form of anti-friction bearing illustrated is a pair of radial ball bearings, shown interposed between the journal and the supporting device. One of these ball bearings has an inner ring 7, and an outer ring 8, the other an inner ring 9, and an outer ring 10. Balls 11 are shown interposed between the respective ball bearing rings which are of the deep groove, uninterrupted type. A sleeve 12 is shown surrounding the journal 6, and is assumed to have a free but not loose fit thereon. The sleeve is intended to rotate with the journal 6, but to have a certain amount of independent longitudinal movement. The outer end of the sleeve is provided with a head 13, which has an angular opening 14, engaging an angular reduced extension 15 of the journal. This permits the parts to rotate in unison. A coiled compresion spring 16 is shown mounted between the head 13 and the end of the journal tending to normally force the sleeve outwardly. The sleeve has an abutment 17 preferably complemental to the fillet 18, at the end of the journal, whereby the outward movement of the journal, relatively to the sleeve, is limited. Inwardly of the shoulder 17, the sleeve has a substantially cylindrical portion 19, which passes over the axle inwardly of the journal portion 6 for the purpose of excluding dirt etc. from the relatively moving parts just described.

In the illustrated form of the device the inner rings 7 and 9 of the ball bearings are rigidly mounted upon the sleeve. The portion 19 of the sleeve is shown having a shoulder on its outward face which engages the inner ring 7, the outer side of such ring is engaged by a sleeve 20, which in turn is engaged by the inner face of the ball bearing ring 9. These parts are clamped in position by means of a suitable nut 21 having screw threaded connection with the outer end of the sleeve 12. A suitable washer 22 is shown interposed between the nut 21 and the ring 9. Some convenient means is to be employed for preventing the loosening of the nut 21. In the present instance the nut is split in a well known manner, and set screws 30 employed for deforming the convolutions of the thread of the nut. The outer rings of the ball bearings are mounted in a housing, which is secured in some suitable manner to the body or frame work of the car. In the present illustration the housing comprises an outer casing member 23, which is formed inwardly of its ends with a pair of flanges 24, 25. The outer ring 8 of the ball bearing at the inner end of the journal box is clamped against the shoulder 24 by means of a suitable closure member 26, having a flange 27 for engaging the ring 8. This closure is also provided with grooves for carrying packing rings, and is held in position by suitable tap bolts. The closure 28 at the outer end of the journal is also provided with a flange 29 disposed outwardly of the outer ring 10 of the ball bearing at the outer end of the journal box. This ring 10, however, is preferably given quite an amount of freedom to move longitudinally, whereby, inequalities of the parts or uneven expansion will not tend to bind the bearing. Each of the bearings illustrated is capable of sustaining end or axial thrust in either direction in addition to the radial load placed upon it. According to the illustrated construction both bearings cooperate in carrying the radial load and the end thrust is taken by the bearing at the inner end, that at the other end being free of such axial load.

When our improved journal boxes are installed according to present railway practice, the boxes mounted on the journals provided at the respective ends of the axle are secured to the framework of the car at such distance apart that each box prevents sufficient movement of the axle toward that end to withdraw the journal at the opposite end from the other box. The journal is loose in the box except for the means provided for causing the sleeve to rotate with the journal when the parts are in working relation, there being entire absence of fastening means between the box and the journal. The axial or longitudinal movement of the axle in either direction is accompanied by a tendency for the journal at that end to move inwardly of its box, and for that at the other end to move outward relatively to its box. The thrust at the latter box is first received by the spring 16, which is compressed, and thus yielding, applies the load of the thrust to the inner bearing. This organization serves to intercept a great deal of the shocks which are normally communicated to a railway vehicle from the wheels, and permits a certain amount of floating, such floating being restrained by elastic means, and also by positive means, namely, the shoulders 17 and 18 which become active upon a predetermined compression of the spring.

In originally applying the device to a journal the workman has nothing whatever to do with the positioning and adjustment of the ball bearings and their mountings. He takes the entire journal box as a self-contained handling unit, and, with the exception of the spring 16, has to do with the mounting of but a single part. Not only is the original installation of this journal box a most simple matter, but the replacement for the purpose of replacing worn or broken bearings is also very simple, particularly as there are no fastenings between the journal and box. The workman in the yards only has to remove one journal box, and substitute another. The box is then sent to the shop where proper facilities for handling it prevail. The simplicity of the replacement in the journal boxes of the axle, for the purpose of its repair or that of the wheels carried by it, is, it is believed, quite obvious from the foregoing explanation.

The journal box, upon its removal, may be stood up on either end for permitting the opening of the other end and the inspection of the bearing at such end while retaining the contained lubricant.

The outwardly facing flange face of the portion 19 at the inner end of the sleeve has such relation to the ball bearing, and the inwardly facing face of the flange 24 of the casing, and to the shoulders 17 and 18 that the ball bearing at the inner end of the journal will take the thrust load due to the outward movement of the axle, and that the lines of force transmitted through the sleeve to such ball bearing are the same whether these are communicated thereto by the spring 16, or by the interengagement of the shoulders 17 and 18. It is further to be noted that upon such interengagement of these shoulders the parts of the ball bearing, and its supporting flanges are located in substantially a direct line from the point of engagement between such shoulders. This ball bearing for taking the thrust load, and a certain amount of the radial load is assisted in this radial load carrying function by means of the ball bearing at the outer end of the casing. During thrust loads or shocks it will be found that this outer radial bearing serves to steady the parts associated with the inner bearing so that the thrust load is uniformly distributed thereon.

It is to be understood that changes in details of construction may be resorted to as occasion demands within the scope of the claims without departing from the spirit of the invention.

We claim as our invention:

1. The combination with a journal, of a sleeve surrounding the same and adapted to reciprocate relatively thereto, means for causing the sleeve to rotate with the journal, the sleeve and the journal respectively having inwardly and outwardly facing abutments, a compression spring between such abutments and adapted to be compressed upon outward movement of the journal, the latter otherwise being normally loose in the box, a casing surrounding the sleeve, and anti-friction bearings mounted in the casing and upon the sleeve, one of said bearings being constructed, adapted and located in position for receiving the thrust load of the said outward movement of the journal through the medium the said compression spring.

2. The combination with a journal, of a sleeve surrounding the same and adapted to reciprocate relatively thereto, means for causing the sleeve to rotate with the journal, the sleeve and the journal respectively having inwardly and outwardly facing abutments, a compression spring between such abutments and adapted to be compressed upon outward movement of the journal, a casing surrounding the sleeve, and anti-friction bearings each having its inner member rigid with the sleeve, a casing surrounding said sleeve and anti-friction bearings and supporting the outer members of the same, at least one of said outer members being mounted rigid with the casing, the bearing comprising such outer member being adapted to take end thrust in either direction, and closures carried by the casing for enclosing the space between the housing and the sleeve.

3. A journal box, comprising a sleeve adaped to embrace a journal and engage the same for reciprocation thereon and rotation therewith, anti-friction bearings each having its inner member mounted on the sleeve, a casing surrounding said sleeve and anti-friction bearings and supporting the outer members of the same, and closures carried by the casing for enclosing the space between the housing and the sleeve, the assembled structure being constructed and adapted to be interchangeably loosely mounted as a self-contained handling unit upon the journal of a car axle, and while so assembled, to be demounted therefrom.

4. A structure as specified in claim 3 wherein one of the anti-friction bearings is capable of carrying radial and thrust loads and its inner and outer rings respectively rigidly mounted upon the sleeve and within the casing.

5. A structure as specified in claim 3 wherein one of the anti-friction bearings is capable of carrying radial load and thrust load in both axial directions, and its inner and outer rings respectively rigidly mounted upon the sleeve and within the casing, and wherein one of the rings of another of the bearings is slidably mounted and capable of axial movement relative to the similar ring of the rigidly mounted bearing.

6. The combination with a journal having an outwardly facing shoulder formed at its inner end and an angular extension at its outer end, of a journal box mounted thereon, and comprising a sleeve adapted to embrace the journal, said sleeve having an angular opening for engagement with the said angular extenson of the journal, and a shoulder for engaging the shoulder thereon, a compression spring between the journal and sleeve for holding said shoulders normally out of engagement, anti-friction bearings each having its inner member rigid with the sleeve, a casing surrounding said sleeve and anti-friction bearings and supporting the outer members of the same, at least one of said outer members being mounted rigid with the casing, and closures carried by the casing for enclosing the space between the housing and the sleeve.

7. A journal box, comprising a sleeve adapted to embrace a journal, a pair of anti-friction bearings the inner members of which being mounted on the sleeve, means clamping the said members to the sleeve, means carried by the sleeve for engaging a journal to cause the sleeve to rotate therewith, a casing within the respective ends of which the journal engaging means and the outer members of the anti-friction bearings are mounted and housed, and lubricant retaining closures for the respective ends of the casing, each being constructed and adapted for permitting access to the adjacent bearing while the other closure remains in place retaining the lubricant within the casing.

8. In a device of the character specified, the combination with an axle, the same being reduced at the end forming a journal and a shoulder inwardly thereof, of a sleeve surrounding the journal and having on its interior a shoulder adapted to engage the said shoulder of the axle upon outward or thrust movement of the axle, the sleeve having on its exterior adjacent and outwardly of the shoulder thereon an outwardly facing flange, a combined radial and thrust ball bearing mounted on the sleeve and having its inner ring engaging such flange, a casing surrounding the sleeve and having an inwardly facing flange engaging the outer ring of the said ball bearing, an elastically yieldable means for resisting a predetermined amount of thrust, and holding the said shoulders apart, the lines of force transmitted through the sleeve to the said ball bearing being the same whether communicated thereto by the elastically yieldable means or by the interengagement of the said shoulders.

9. In a device of the character specified, the combination with a journal having at its inward end an outwardly facing shoulder, of a sleeve surrounding the journal and having a shoulder at its inner end adapted to engage the said shoulder of the axle upon outward or thrust movement of the axle, the sleeve having on its exterior inner end an outwardly facing flange, a combined radial and thrust ball bearing mounted on the sleeve and having its inner face engaging the said flange, a casing surrounding the sleeve and having an inwardly facing flange engaging the outer ring of the said ball bearing, a spring adapted to resist a predetermined amount of end thrust between the sleeve and the journal for holding the said shoulders apart, a radial bearing mounted between the casing and the sleeve adjacent the outer end of the journal, the lines of force transmitted through the sleeve to the said thrust receiving ball bearing being the same whether communicated thereto by the spring or by the interengagement of the said shoulders.

In testimony whereof, we have affixed our signatures hereto.

HAROLD E. BRUNNER.
WILLIAM JETTER.